United States Patent [19]
Kahn

[11] 3,846,776
[45] Nov. 5, 1974

[54] LIQUID LEVEL SENSOR

[75] Inventor: David Kahn, Harrisburg, Pa.

[73] Assignee: AMP Incorporated, Harrisburg, Pa.

[22] Filed: Apr. 16, 1973

[21] Appl. No.: 351,715

[52] U.S. Cl............. 340/244 R, 252/518, 252/520, 317/234, 338/22, 340/59, 340/244 E, 73/295
[51] Int. Cl. .......................................... G08b 21/00
[58] Field of Search............ 340/244 R, 59; 338/22; 252/518, 520, 521; 317/234, 235; 307/278, 310; 73/295

[56] References Cited
UNITED STATES PATENTS
3,475,745  10/1969  White, Jr. ............................. 340/59
3,543,104  11/1970  Jun-Ichi-Umeda.................. 317/235

*Primary Examiner*—John W. Caldwell
*Assistant Examiner*—Daniel Myer

[57] ABSTRACT

A sensor for detecting the presence of a heat conducting medium above a predetermined level in a container includes an electrical resistance element and a polyconductor having a predetermined transition temperature point selected at a temperature above the temperature to which the heat conducting medium is normally subjected. The polyconductor is thermally connected to the resistance element and that element has a predetermined resistance value selected to dissipate heat produced therein to the heat conducting medium at a temperature below the transition temperature of the polyconductor when immersed in the heat conducting medium, and to heat the polyconductor, in the absence of the heat conducting medium, to a temperature above the transition temperature whereby the polyconductor becomes conductive. In one embodiment of the invention the polyconductor is connected to a signal device which produces a signal when the polyconductor becomes conductive in this manner.

10 Claims, 3 Drawing Figures

PATENTED NOV 5 1974
3,846,776
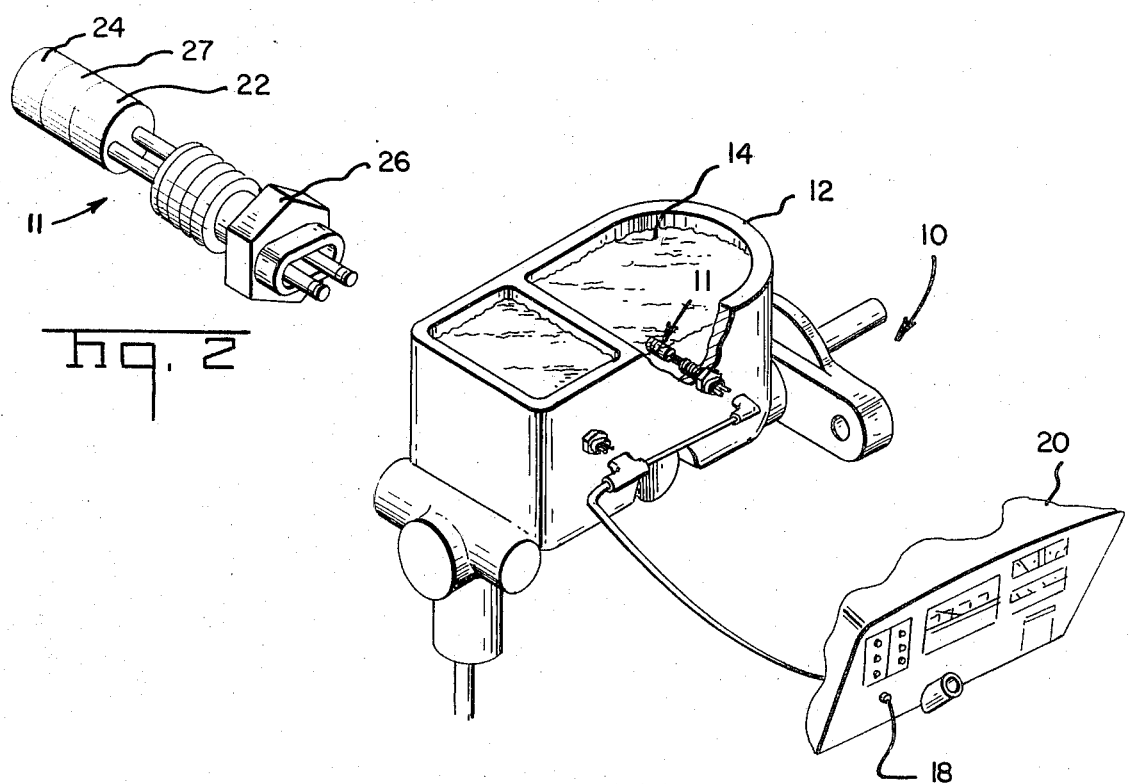
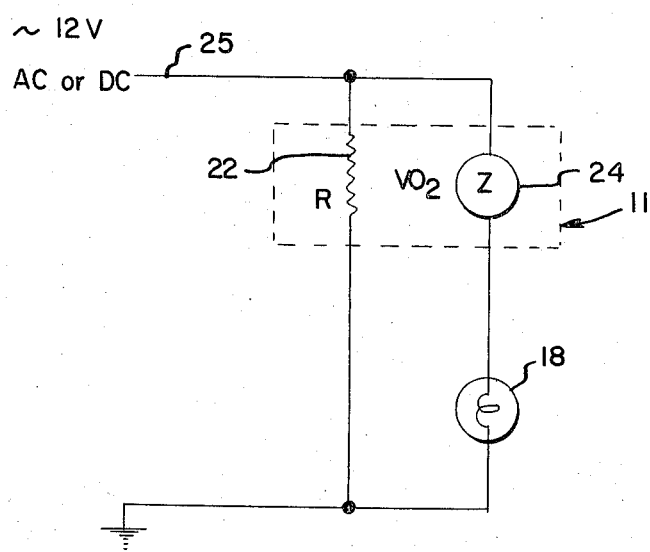

LIQUID LEVEL SENSOR

The present invention relates to a device for determining the presence or absence of a heat conducting medium in a container, and more particularly to a sensor for determining when the liquid level in a container drops below a predetermined level.

It is often desirable to determine when the level of a liquid or other medium in a container falls below a certain predetermined level. This is particularly important in a number of applications where a predetermined liquid level must be maintained at all times in order to insure safe operation of a device. For example, in the master brake cylinder of an automobile the level of the brake fluid must be maintained above a predetermined level in the master cylinder in order for the brakes to operate properly. In view of the importance of the automobile braking system to the safety of the passengers in the vehicle, it is thus desirable that an automatic signal be provided to the operator of the vehicle in the event that the brake fluid level in the master cylinder falls below the safe level.

Although a variety of sensor devices are available to detect liquid levels in many types of containers, such devices are relatively complicated and excessively expensive for use in the mass production operations of the automotive industry. Moreover, since such previously proposed systems often use many moving parts, they do not have the long life and reliability which are required from safety devices in automobiles.

Accordingly, it is an object of the present invention to provide a liquid level sensor which is reliable in operation and inexpensive in manufacture.

Yet another object of the present invention is to provide a liquid level warning system which has no moving parts and which has a long operative life.

Another object of the present invention is to provide a brake fluid level warning system which is both inexpensive in manufacture and reliable in operation.

In accordance with the present invention, a brake fluid level warning system is provided which utilizes an advantageous feature available in recently developed materials commonly referred to in the art as polyconductors. These polyconductors are made in a variety of compositions and have the peculiar characteristic of exhibiting metallic conductivity above, and little or no electrical conductivity below, a predetermined transition temperature. A number of such polyconductors and processes for doping the conductors in order to adjust the desired transition temperatures thereof are disclosed in U.S. Pat. Nos. 3,402,131 to Futaki, et al, and 3,532,641 to Chamberland. In addition to the polyconductors disclosed in those patents, numerous other types of polyconductors are available, each of which have a transition temperature at which the element abruptly changes its electrical property, being relatively non-conductive below the transition temperature, $T_c$, and being electrically conductive above the transition temperature.

In the illustrative embodiment of the invention the characteristics of the polyconductors are advantageously used in combination with a resistance type heating element mounted at a predetermined level in a container for liquid, in order to determine when the level of the liquid drops below that predetermined level. More particularly, the container is preferably the master cylinder of an automobile in which brake fluid is contained. The electrical resistance heating element is thermally connected to a polyconductor and to a source of current, i.e. the battery of the automobile. The resistance value of the electrical resistance heating element is selected such that the heat produced therein by the battery current is dissipated to the brake fluid, when the resistance element is immersed therein, at a rate which maintains the temperature of the element and the polyconductor below the transition temperature of the latter.

Preferably, the polyconductor is selected such that its transition temperature has a value which is above the temperature to which the brake fluid is normally subjected during the operation of the automobile. By this arrangement, when the level of the brake fluid falls below the level of the resistance element, heat is no longer dissipated from the element to the brake fluid and heat then is transmitted directly to the polyconductor, raising its temperature above the selected transition temperature. When that occurs, the polyconductor becomes electrically conductive. Thus, the device can be used as a switch to activate a signal, e.g., a light on the dashboard of the vehicle warning the operator that the brake fluid level has become dangerously low.

The above, and other objects, features and advantages of the present invention, will be apparent in the following detailed description of an illustrative embodiment thereof which is to be read in connection with the accompanying drawings, wherein:

FIG. 1 is a perspective view of a brake fluid level warning system, constructed in accordance with the present invention, and mounted in the master cylinder of an automobile;

FIG. 2 is an enlarged perspective view of the sensor of the present invention; and FIG. 3 is a schematic circuit diagram of the electrical connections used in the sensor of FIGS. 1 and 2.

Referring now to the drawing in detail, and initially to FIG. 1 thereof, it will be seen that a brake fluid level warning system 10, constructed in accordance with the present invention, includes a sensor element 11 mounted in a container 12. In the illustrative embodiment of the invention this container is the master brake cylinder of an automobile and holds a supply of liquid (i.e., brake fluid 14) for distribution and supply through a conduit 16 to the brake system of the automobile.

Preferably, sensor 11 is mounted in the wall of master cylinder 12 at a predetermined location corresponding to the minimum safe level of brake fluid in the container and is operative to provide a signal to the operator of the vehicle when the brake fluid level has fallen below that predetermined safe level. In one embodiment of the invention sensor 11 is electrically connected to a light bulb 18, or other signal device, mounted in the dashboard 20 of the automobile, in order to provide the operator with a visual warning signal.

Sensor 11 consists of two basic elements, a polyconductor 24 and a resistance element 22 which, in this embodiment of the invention, are electrically connected in parallel as shown in FIG. 3. In the completed warning system this resistor-polyconductor circuit is connected to any convenient manner to ground and to a source of current, preferably the battery 25 of the vehicle.

Polyconductor 24 is selected from a material which has a transition temperature which is above the level of the temperature to which the brake fluid within the container 12 is normally subjected. In an application wherein the sensor of the present invention is to be used with an automobile, the transition temperature is selected at about 330° F since the ambient temperature within the engine compartment of the vehicle may reach operating temperatures of as high as 275° F. Thus, it is necessary that the transition temperature be above this operating temperature in order to insure that the polyconductor is not activated by normal operation temperatures of the vehicle.

Some typical polyconductors which may be utilized in the sensor of the present invention include $Ti_2O_3$; $Ti_3O_5$; CrS; FeS; and $VO_2$. These polyconductors each have a different transition temperature so that different polyconductors would be used in the present invention depending upon the temperature at which the transition is to occur. In addition to the above mentioned polyconductors, many other types of polyconductors exhibiting the desirable characteristic of abruptly transforming from a non-conductive to a conductive material may also be utilized. However, it has been found that $Ti_3O_5$ provides satisfactory operation as a brake fluid level sensor as it has a transition temperature of about 330° F.

Of course, it is to be noted that although the sensor of the present invention is described herein for use in relatively high temperature applications in an automobile, the sensor can be used in other applications at substantially lower temperatures, with the polyconductor being selected or adjusted by appropriate doping, in accordance with the temperature range at which the device is to be utilized. It is noted that the term "polyconductor" as used in this specification and the following claims is intended to mean any material exhibiting an abrupt transition between non-metallic conductivity to metallic conductivity at a specific transition temperature.

Resistor 22 cooperates with polyconductur 24 and has a predetermined resistance value selected so that the heat created therein by current flow will be dissipated to the brake fluid in which it is immersed at a rate sufficient to maintain the temperature of the polyconductor to which it is connected, at a level below the transition temperature of the polyconductor. Thus, for example, in the illustrative embodiment of the invention where the sensor would normally be connected to a 12 volt battery, and where a $Ti_3O_5$ polyconductor of 1 sq. cm surface area is provided, the resistor would have a value of between 40 to 720 ohms and preferably a value of 200 ohms.

By the arrangement of the present invention, resistor 22 produces heat as current flows therethrough, in accordance with Joules law, but the value of the resistor is such that the heat produced thereby is dissipated into the surrounding brake fluid which acts as a heat sink, when the level of the fluid is above the level of the sensor. In this connection, reference is made to FIG. 2 wherein it is seen that the sensor 11 is secured in a mounting structure 26 which causes the polyconductor 24 and resistor 22 to extend into the brake fluid in container 12. Mounting structure 26 simply comprises a threaded bolt-type member which is threadedly engaged in the wall of the container 12 in fluid tight relation therewith. The polyconductor 24 preferably is a small disk or rod of material which is thermally connected to resistor 22 through a heat conducting member in any convenient manner, as by a conventional connector 27 between the resistor and the small disk shaped polyconductor.

Resistor 22 is normally fully immersed in the brake fluid during operation of the vehicle when the fluid is above the desired level. On the other hand, in the event that the brake fluid falls below the level at which it is unsafe to operate the vehicle, the resistor is exposed to the atmosphere, which acts as a second heat sink or heat conducting medium of lower heat conductivity than the brake fluid. As a result of the transition from the brake fluid to air surrounding the resistor, the heat produced by the resistor is no longer dissipated to the brake fluid, but rather is conducted through connector 27 to polyconductor 24. Because of the preselected value of the resistor, the heat supplied therefrom will then cause an increase in the temperature of the polyconductor 24 to a temperature above its transition temperature, (i.e., above 300° F) causing the polyconductor to become conductive and thus permitting current to flow from the battery through the polyconductor. Accordingly, the polyconductor acts as a switch which selectively permits current to flow therethrough in accordance with the temperature of the conductor.

Referring again to FIG. 3 of the drawings, it is seen that in the illustrative embodiment of the invention the lamp 18 is electrically connected in series with polyconductor 24. By this arrangement, with polyconductor 24 becomes conductive, as a result of the liquid level within container 12 falling below the level of sensor 11, the current flowing through the polyconductor causes lamp 18 to light, providing a visual warning signal to the operator that the level of the brake fluid in the master cylinder has become unsafe. Of course, it is to be understood that other types of warning signals such as buzzers or flashing lights can be utilized in lieu of lamp 18.

It is also noted that resistor 22 is selected such that it is adapted to heat the polyconductor 24 to the transition temperature from low initiation temperatures, of at least −40° F, so that in the event that the container 12 becomes empty or leaks overnight, during the winter, the resistor will still provide sufficient heat to heat the polyconductor 22 to its transition temperature.

Another feature of polyconductors which is advantageously utilized by the present invention is the fact that such conductors generally become more conductive as their temperature increases above the transition temperature. As a result, the polyconductors are self-latching in that once they have reached their transition temperature, so that current passes therethrough, the current flowing through the conductor will produce additional heat, in accordance with Joules law, to further increase the temperature and conductivity of the conductor, and hold it above the transition temperature. Thus, once the polyconductor becomes conductive, it will stay conductive until disconnected from the current source. Accordingly, the warning light 18 will stay on until the operator stops the engine and fills the master cylinder to the appropriate level above sensor 11.

A further feature of the present invention is that the value of resistor 22 is selected such that a time-temperature lag is built into the sensor. That is, after the fluid level within the container drops below the level of the sensor 11, it will take a predetermined period of time, depending upon the value of the resistor 22 and the configuration of the thermal connection 27 between the resistor and the polyconductor, for the resistor to raise the temperature of the polyconductor above the transition temperature. Preferably, the resistor is selected to provide a time lag of between 10 and 60 seconds, preferably 30 seconds, after the drop of the liquid level below the level of the sensor. This time lag is desirable particularly in applications such as brake fluid level warning systems, wherein the container in which the sensor is mounted is subjected to substantial movement and vibrations which may cause the liquid level to oscillate within the container. More specifically, in an automobile, going over a bumpy road or the like, the upper surface of the brake fluid in the container may shift in response to the bumps, causing the sensor 11 to be momentarily exposed above the liquid level, even when the cylinder is substantially full. In such instances it would be undesirable for the warning light to be turned on since the liquid level in fact is satisfactory, but has merely momentarily exposed the sensor.

This time lag can also be adjusted by doping the polyconductor material which a high resistivity compound such as carbon or a carbon compound. This material does not effect the transition temperature but will effect the rate of Joule heating of the polyconductor as a result of the small current leak through the polyconductor when it is below its transition temperature. By varying the rate of Joule heating in this manner, the time required for the polyconductor to reach its transition temperature is adjusted.

The duration of time between the liquid level drop and the attainment of a transition by the polyconductor also can be adjusted by changing the resistor value and the heat path connection between the resistor and the polyconductor. Thus, the time-temperature lag may be precisely adjusted to the selected time period, preferably 30 seconds.

In this connection it is noted that the illustrative embodiment of the invention has the polyconductor 24 located in close juxtaposition to registor 22 in the same electrical circuit so that the polyconductor and resistor are both thermally and electrically interconnected. However, it is only necessary to the invention that the polyconductor to thermally connected to the resistor so that the latter can heat the polyconductor for the latter to operate as a switch. That is, it is contemplated that the resistor and polyconductor may be connected to different circuits having the same or independent sources of current with the polyconductor and resistor simply being thermally connected either by their close proximity to each other or by a thermally conductive element so that the polyconductor is subjected to heating by the resistor. The polyconductor will then operate in the same manner as previously described when it reaches its transition temperature, i.e., as a switch, but will control a signal device or the like in its own independent circuit.

Accordingly, it is seen that a relatively simple and inexpensive liquid level sensor is provided which utilizes no moving parts and thus will have an extremely long operative life. Moreover, because the polyconductors utilized in the present invention have an abrupt transition in their characteristics when the transition temperature is reached an accurate and reliable sensor is provided.

As mentioned, the sensor of the invention has been particularly described with reference to use in a brake fluid level warning system. However, it will be understood by those skilled in the art that the sensor can be used in substantially any type of system in which the level of a liquid is to be constantly monitored or wherein a transition from one fluid medium or heat sink to another occurs.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A device, adapted to be connected to a source of current, for detecting the presence or absence of a heat conducting medium, said device comprising an electrical resistance element and a polyconductor having a predetermined transition temperature selected at a temperature above the temperature to which said heat conducting medium is normally subjected, said polyconductor being thermally connected to said resistance element and said resistance element having a predetermined resistance value selected to dissipate heat to said heat conducting medium at a temperature below the transition temperature of said polyconductor when surrounded by said heat conducting medium and to heat said polyconductor to a temperature above said transition temperature, in the absence of said heat conducting medium, whereby said polyconductor becomes conductive.

2. The device as defined in claim 1 including signal means operatively connected to said polyconductor for producing a signal when said polyconductor becomes conductive.

3. A device for detecting a drop in the liquid level in a container below a predetermined level, said device being adapted to be connected to a source of electrical current and comprising an electrical resistance element adapted to be mounted in said container at said predetermined level, a polyconductor having a predetermined transition temperature selected at a temperature above the temperature to which liquid in said container is normally subjected, said polyconductor being thermally connected to said resistance element; said resistance element having a predetermined resistance value selected to dissipate heat produced therein by said current to said liquid, when immersed therein, at a rate which maintains the temperature of said element and polyconductor below said transition temperature and to heat said polyconductor to a temperature above said transition temperature when the level of said liquid falls below said predetermined level, exposing said element, whereby said polyconductor becomes electrically conductive; and signal means electrically connected to said polyconductor for producing a signal when said polyconductor becomes conductive.

4. The device as defined in claim 3 wherein said liquid in automobile brake fluid, said container is a master brake cylinder, and said transition temperature is 330° F.

5. The device as defined in claim 3 wherein said transition temperature is 330° F and said resistance value of said element is selected to produce sufficient heat to heat said polyconductor to its transition temperature, when said liquid level is below said predetermined level, from any initial temperature within the range of −40° F to 330° F.

6. The device as defined in claim 4 wherein said resistance element, polyconductor and the electrical connection therebetween have a time-temperature lag of between 10 to 60 seconds whereby said resistance element heats said polyconductor to said transition temperature within 10 to 60 seconds of the said liquid level falling below said predetermined level.

7. The device as defined in claim 6 wherein said time-temperature lag is 30 seconds.

8. The device as defined in claim 3 wherein said resistance element and polyconductor are electrically connected in parallel to said current source.

9. The device as defined in claim 3 wherein said polyconductor has the characteristic that its conductivity above said transition temperature increases as its temperature increases, whereby once said polyconductor becomes conductive the heat produced by current flowing therethrough keeps the polyconductor conductive until the polyconductor is disconnected from the current source.

10. A temperature activated differential medium sensing switch device comprising a current source, an electrical resistance element operatively connected to said source, a first heat sink comprising a first heat conducting medium, a second heat sink comprising a second heat conducting medium, and a polyconductor having a predetermined transition temperature selected at a temperature above the temperature to which said first heat conducting medium is normally subjected, said polyconductor being thermally connected to said resistance element and said resistance element having a resistance value selected to heat said polyconductor to a temperature above said transition temperature in a transition of said element from said first medium to said second medium.

* * * * *